(12) United States Patent
Ding et al.

(10) Patent No.: US 11,010,097 B2
(45) Date of Patent: May 18, 2021

(54) APPARATUS, SYSTEMS, AND METHODS FOR OFFLOADING DATA OPERATIONS TO A STORAGE SYSTEM

(71) Applicant: International Business Machines Corporation, Armonk, NY (US)

(72) Inventors: Ning Ding, Shanghai (CN); Yao Dong Zhang, Shanghai (CN); Zhen Nyu Yao, Shanghai (CN); Bo Liu, Shanghai (CN); Wei Feng Yang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/574,353

(22) Filed: Sep. 18, 2019

(65) Prior Publication Data

US 2021/0081142 A1 Mar. 18, 2021

(51) Int. Cl.
*G06F 3/06* (2006.01)

(52) U.S. Cl.
CPC ............ *G06F 3/0659* (2013.01); *G06F 3/067* (2013.01); *G06F 3/0614* (2013.01)

(58) Field of Classification Search
CPC .................................................... G06F 3/0659
USPC ......................................................... 711/154
See application file for complete search history.

(56) References Cited

U.S. PATENT DOCUMENTS

| | | | |
|---|---|---|---|
| 8,533,163 B2 | 9/2013 | Feeney et al. | |
| 9,601,151 B1 | 3/2017 | Crawford et al. | |
| 9,697,034 B2 | 7/2017 | Chadha et al. | |
| 2005/0030585 A1* | 2/2005 | Suwa | H04N 1/46 358/1.16 |
| 2012/0030434 A1* | 2/2012 | Nickel | G11C 13/0069 711/154 |
| 2012/0324560 A1 | 12/2012 | Matthew et al. | |
| 2015/0234715 A1 | 8/2015 | Knight et al. | |
| 2018/0173441 A1 | 6/2018 | Cargnini et al. | |
| 2018/0364947 A1 | 12/2018 | Jean | |

OTHER PUBLICATIONS

Y. Kang, Enabling Cost-effective Data Processing with Smart SSD:, 2013 IEEE 29th Symposium on Mass Storage Systems and Technologies (MSST), May 6-10, 2014, pp. 1-12.
S. Jun et al., "Scalable Multi-Access Flash Store for Big Data Analytics", AMC, Feb. 26-28, 2014, pp. 1-10.
V. Seshadri et al., "Chapter Four—Simple Operations in Memory to Reduce Data Movement", Advances in Computers, vol. 106, 2017, Science Direct, pp. 1-3.

* cited by examiner

*Primary Examiner* — Jae U Yu
(74) *Attorney, Agent, or Firm* — Kunzler Bean & Adamson

(57) ABSTRACT

Methods that can offload data operations to a storage system are provided. One method includes performing, by a processor, a set of non-storage operations at a storage system for data stored in a set of storage devices on the storage system to generate a set of results, in which the storage system is separate from a client device that owns the data, and transmitting the result(s) to the client device that owns the data. Apparatus, systems, and computer program products that can include, perform, and/or implement the methods are also disclosed herein.

20 Claims, 12 Drawing Sheets

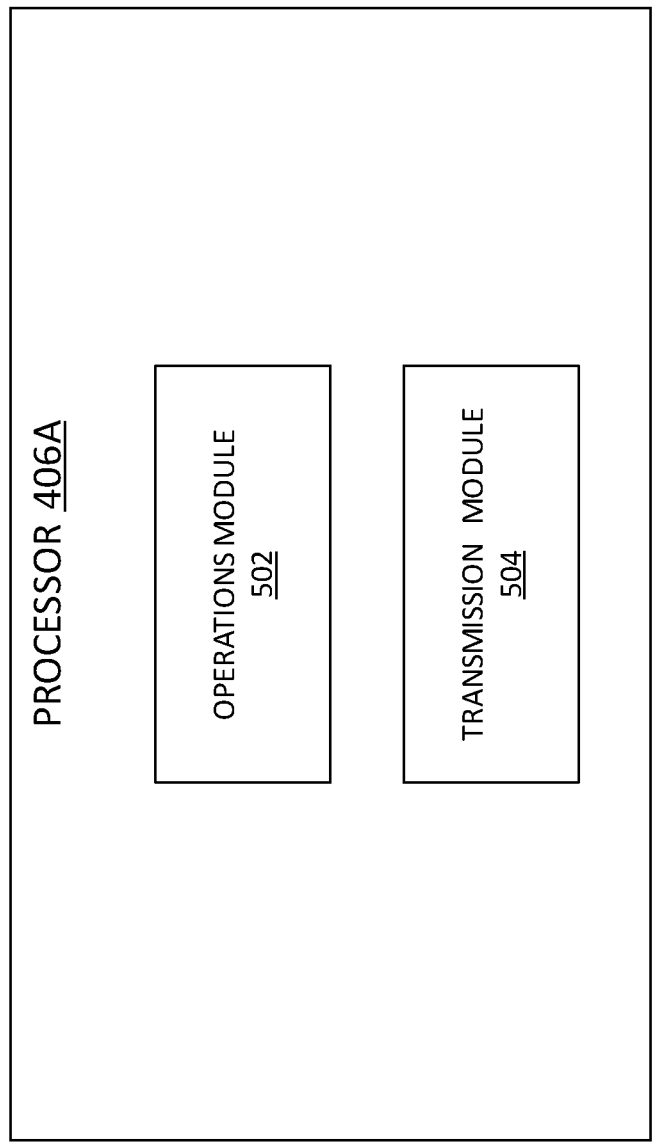

APPARATUS, SYSTEMS, AND METHODS FOR OFFLOADING DATA OPERATIONS TO A STORAGE SYSTEM

FIELD

The subject matter disclosed herein relates to computing networks and systems and, more particularly, relates to apparatus, systems, and methods that can offload data operations to a storage system.

BACKGROUND

Data workload operations in conventional storage networks and/or systems often include transmitting the data that is the target of a set of data operations from one or more storage devices on a storage system to a computing device (e.g., a client computing device), the computing device performing the data operation(s), and the data being transmitted back to the storage system for storage therein. When the size of the data that is the target of a set of data operations is large, the bandwidth between the storage system and the computing device may be reduced, which can increase the amount of time it takes to perform the set of data operations.

BRIEF SUMMARY

Apparatus and systems that can offload data operations to a storage system are provided. One apparatus and/or system includes an operations module that performs a set of non-storage operations at a storage system for data stored in a set of storage devices on the storage system to generate a set of results and a transmission module that transmits the result(s) to a client device that owns the data and is separate from the storage system. In additional or alternative embodiments, at least a portion of the modules includes one or more of a set of hardware circuits, a set of programmable hardware devices, and/or executable code stored on a set of non-transitory computer-readable storage media.

Methods that can offload data operations to a storage system are also provided. One method includes performing, by a processor, a set of non-storage operations at a storage system for data stored in a set of storage devices on the storage system to generate a set of results in which the storage system is separate from a client device that owns the data and transmitting the result(s) to the client device.

Also disclosed are computer program products including a computer-readable storage medium including program instructions embodied therewith that can offload data operations to a storage system. The program instructions are executable by a processor and cause the processor to perform a set of non-storage operations at a storage system for data stored in a set of storage devices on the storage system to generate a set of results, in which the storage system is separate from a client device that owns the data, and transmit the result(s) to the client device.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which:

FIGS. 5A and 5B are block diagrams of various embodiments of a processor included in the storage system of FIG. 4;

DETAILED DESCRIPTION

Figure 1:
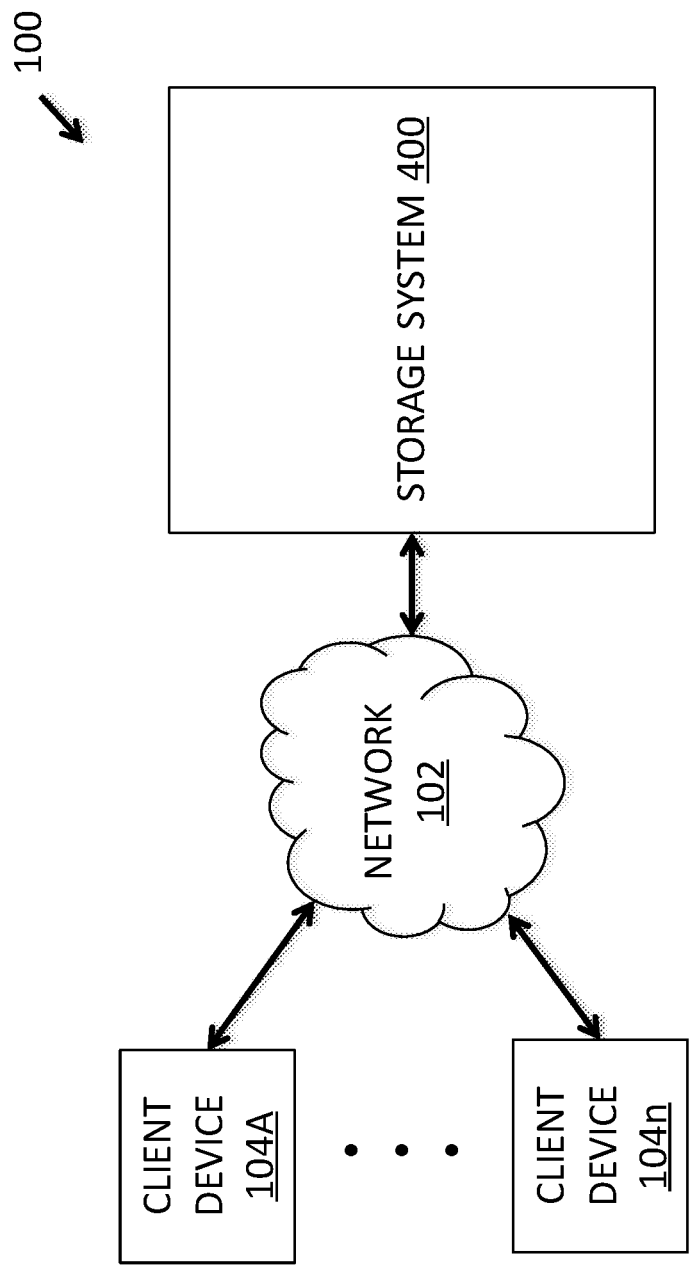
FIG. 1 is a block diagram of one embodiment of a storage network for offloading data operations to a storage system.

Disclosed herein are various embodiments providing apparatus, systems, methods, and computer program products that can offload data operations to a storage system. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1 is a block diagram of one embodiment of a storage network 100 (or system) for offloading data operations to a storage system. At least in the illustrated embodiment, storage network 100 includes a network 102 connecting a set of client devices 104A through 104n (also simply referred individually, in various groups, or collectively as client device(s) 104) and a storage system 400. The network 102 may be any suitable wired and/or wireless network 102 (e.g., public and/or private computer networks in any number and/or configuration (e.g., the Internet, an intranet, a cloud network, etc.)) that is known or developed in the future that enables the set of storage devices 104 and the storage system 400 to be coupled to and/or in communication with one another and/or to share resources. In various embodiments, the network 102 can include a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources that are possible and contemplated herein.

A client device 104 can be any suitable computing hardware and/or software (e.g., a thick client, a thin client, or hybrid thereof) capable of accessing the storage system 400 via the network 102. In various embodiments, a client device 104 can be considered a host device 104 and/or a host computing device 104.

Each client device 104, as part of its respective operation, relies on sending I/O requests to the storage system 400 to write data, read data, and/or modify data. Specifically, each client device 104 can transmit I/O requests to read, write, store, communicate, propagate, and/or transport instructions, data, computer programs, software, code, routines, etc., to the storage system 400 and may include at least a portion of a client-server model. In general, the storage system 400 can be accessed by the client device(s) 104 and/or communication with the storage system 400 can be initiated by the client device(s) 104 through a network socket (not shown) utilizing one or more inter-process networking techniques.

Figure 2:
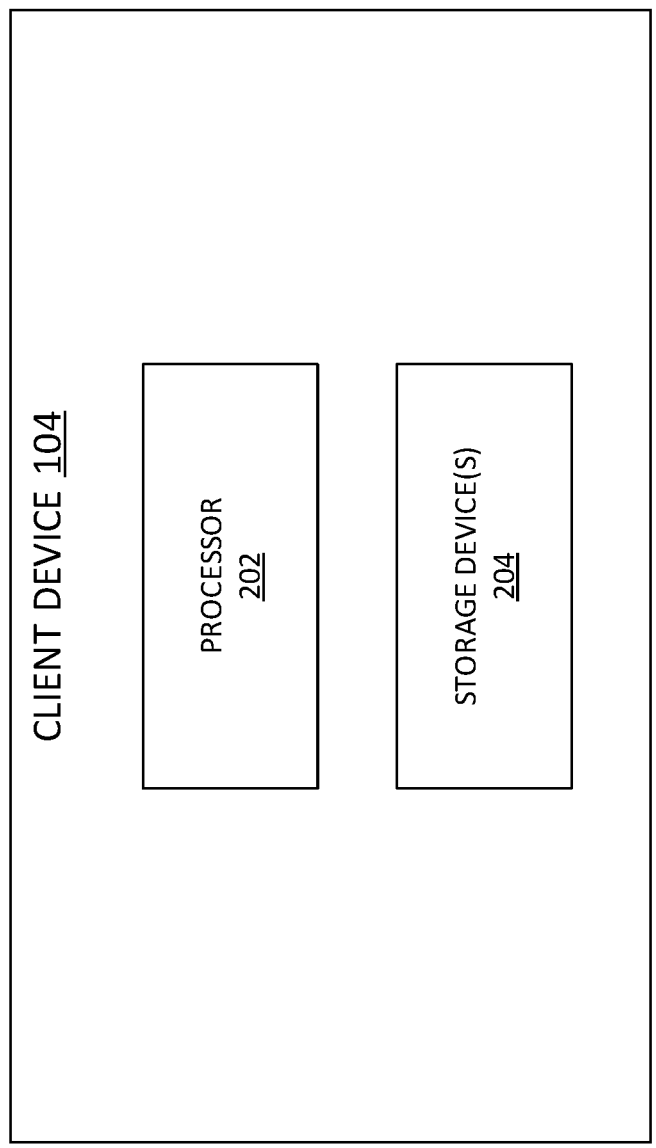
FIG. 2 is a block diagram of one embodiment of a client device included in the storage network of FIG. 1.

While the storage network 100 illustrated in FIG. 2 includes two (2) client devices 104 (e.g., client devices 104A and 104n), the various embodiments of the storage network 100 are not limited to two client devices 104. That is, a storage network may include one (1) client device 104 or a quantity of client devices 104 that is greater than two client devices 104, In other words, various other embodiments of the storage network 100 may include any suitable of quantity of client devices 104.

Referring to FIG. 2, FIG. 2 is a block diagram of one embodiment of a client device 104. At least in the illustrated embodiment, the client device 104 includes, among other components, a processor 202 coupled to and/or in communication with a set of storage devices 204.

A processor 202 may include any suitable non-volatile/persistent hardware and/or software capable of performing computer processes, functions, and/or algorithms, especially transmitting I/O requests and/or performing I/O operations as discussed elsewhere herein. In some embodiments, the processor 202 includes hardware and/or software configured to execute instructions in one or more modules and/or applications that can transmit a set of commands to the storage system 400 to perform one or more operations on data stored on the storage system and receive the results of the operation(s) from the storage system 400. In some embodiments, the set of operations may include one or more operations that can be and/or are typically performed on a host computing device (e.g., a client device 104) and/or is unrelated to the storage operations typically performed by a conventional storage system, which operations are referred to herein as non-storage operations.

Figure 3A:
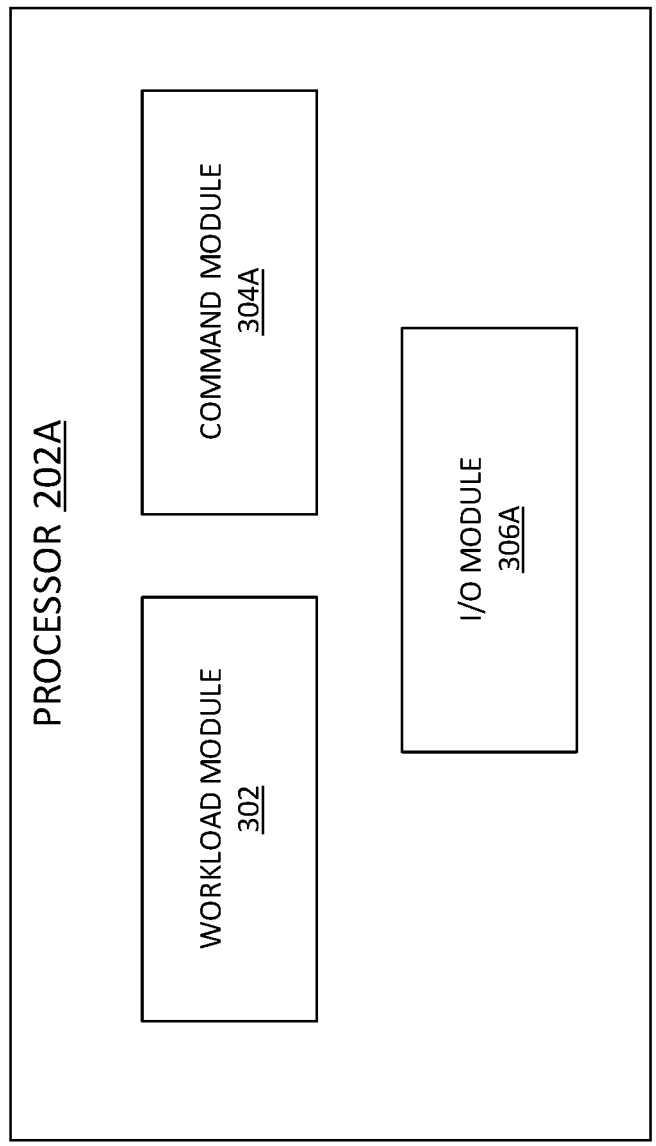
FIGS. 3A through 3C are block diagrams of various embodiments of a processor included in the client device of FIG. 2.

With reference to FIG. 3A, FIG. 3A is a block diagram of one embodiment of a processor 202A that can be included in and/or as a portion of a client device 104. At least in the illustrated embodiment, a processor 202A can include, among other components, a workload module 302, a command module 304A, and an input/output (I/O) module 306A coupled to and/or in communication with one another.

A workload module 302 may include any suitable hardware and/or software that can manage a workload on a client device 104. In various embodiments, a workload module 302 can determine a current workload amount (e.g., an amount of data processing and/or data operations, etc.) being performed on a client device 104. In additional or alternative embodiments, the workload module 302 can determine whether the workload amount is greater than, less than, or equal to a threshold workload amount, which can be any suitable threshold and/or predetermined workload amount that can cause a decrease in performance and/or, by reducing the workload amount, enables/allows the client device 104 to improve its performance (e.g., increase its lifespan, operate faster, operate more efficiently, and/or operate more reliably, etc., among other performance improvements that are possible and contemplated herein). Further, the workload module 302 is configured to transmit a workload indication of whether the current workload amount is greater than, less than, or equal to the threshold workload amount to a command module 304.

A command module 304A may include any suitable hardware and/or software that can generate a set of commands on a client device 104. In various embodiments, a command module 304A is configured to receive the workload indication from the workload module 302 and generate a set of commands in response to the workload indication indicating that the current workload amount on the client device 104 is greater than or equal to the threshold workload amount. In some embodiments, the set of commands includes one or more instructions for a storage system 400 to perform a set of non-storage operations at the storage system 400 for data stored in/on the storage system 400 that is associated with the particular client device 104 and transmit the result(s) of the non-storage operation(s) to the client device 104, as discussed elsewhere herein. Further, a command module 304A is configured to transmit the generated set of commands for the storage system 400 to an I/O module 306A.

An I/O module 306A may include any suitable hardware and/or software that can transmit a set of commands and/or receive a set of results. In various embodiments, an I/O module 306A is configured to transmit a set of commands generated by a command module 304A to a storage system 400 in response to receiving the command(s) from the command module 304A. In additional or alternative embodiments, an I/O module 306A is configured to receive a set of results generated by the storage system 400. In further embodiments, the I/O module 306A is configured to transmit the result(s) received from the storage system 400 to a set of storage devices 204 in the client device 104.

Figure 3B:
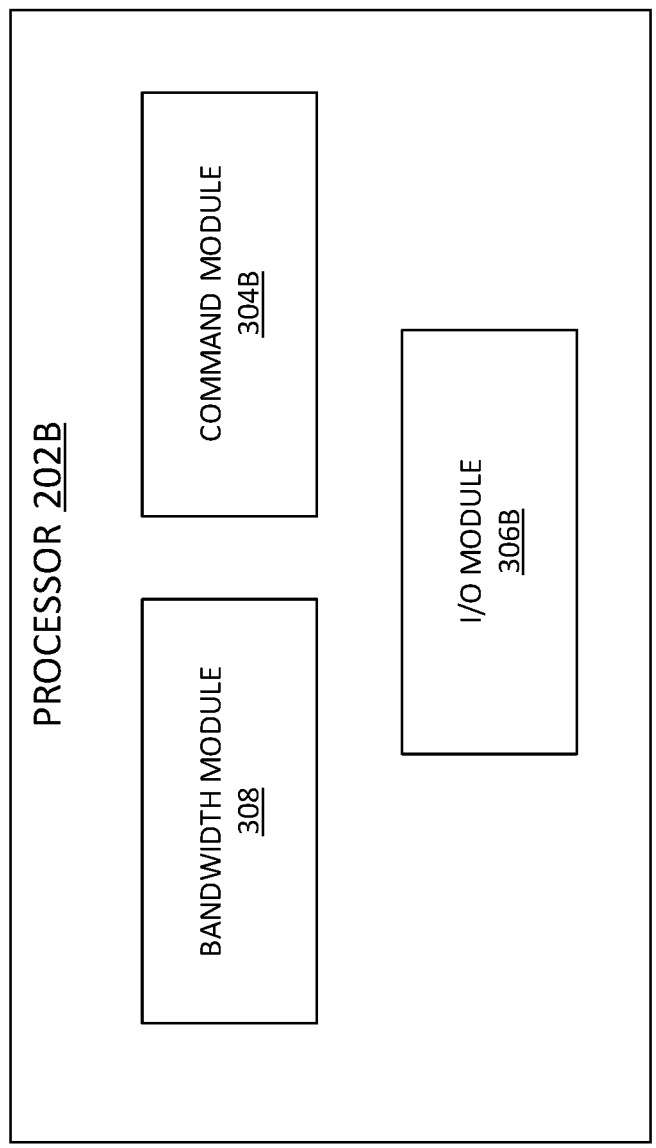

Referring to FIG. 3B, FIG. 3B is a block diagram of another embodiment of a processor 202B that can be included in and/or as a portion of a client device 104. At least in the illustrated embodiment, a processor 202B can include, among other components, a bandwidth module 308, a command module 304B, and an I/O module 306B coupled to and/or in communication with one another.

A bandwidth module 308 may include any suitable hardware and/or software that can determine a communication bandwidth. In various embodiments, a bandwidth module 308 can determine the current communication bandwidth between a client device 104 and a storage system 400. In additional or alternative embodiments, the bandwidth module 308 can determine whether the bandwidth between the client device 104 and the storage system 400 is greater than, less than, or equal to a threshold bandwidth amount, which can include any suitable amount of bandwidth that can cause a decrease in performance of the client device 104 and/or the storage system 400, which by reducing the bandwidth amount, enables/allows the client device 104 and/or the storage system 400 to improve its respective performance (e.g., increase its lifespan, operate faster, operate more efficiently, and/or operate more reliably, etc., among other performance improvements that are possible and contemplated herein), and/or can cause an increase in communication latency between the client device 104 and/or the storage system 400, the reduction of which enables/allows the client device 104 and the storage system 400 to communicate more effectively (e.g., faster, more efficiently, and/or more reliably, etc., among other performance improvements that are possible and contemplated herein). Further, the bandwidth module 308 is configured to transmit a bandwidth indication of whether the current bandwidth amount is greater than, less than, or equal to the threshold bandwidth amount to a command module 304B.

A command module 304B may include any suitable hardware and/or software that can generate a set of commands on a client device 104. In various embodiments, a command module 304B is configured to receive the bandwidth indication from the bandwidth module 308 and generate a set of commands in response to the bandwidth indication indicating that the current bandwidth amount between the client device 104 and the storage system 400 is less than or equal to the threshold bandwidth amount. In some embodiments, the set of commands includes one or more instructions for a storage system 400 to perform a set of non-storage operations at the storage system 400 for data stored in/on the storage system 400 that is associated with the particular client device 104 and transmit the result(s) of the non-storage operation(s) to the client device 104, as discussed elsewhere herein. Further, a command module 304A is configured to transmit the generated set of commands for the storage system 400 to an I/O module 306B.

An I/O module 306B may include any suitable hardware and/or software that can transmit a set of commands and/or receive a set of results. In various embodiments, an I/O module 306B is configured to transmit a set of commands generated by a command module 304B to a storage system 400 in response to receiving the command(s) from the command module 304B. In additional or alternative embodiments, an I/O module 306B is configured to receive a set of results generated by the storage system 400. In further embodiments, the I/O module 306B is configured to transmit the result(s) received from the storage system 400 to a set of storage devices 204 in the client device 104.

Figure 3C:
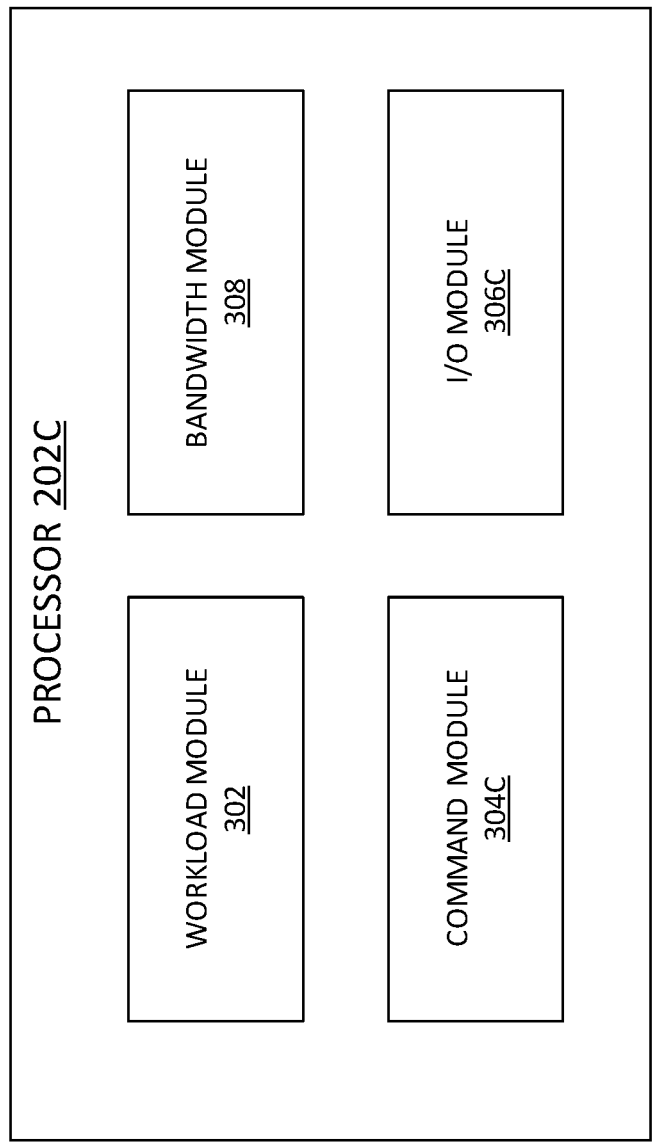

With reference to FIG. 3C, FIG. 3C is a block diagram of yet another embodiment of a processor 202C that can be included in and/or as a portion of a client device 104. At least in the illustrated embodiment, a processor 202C includes a workload module 302 and a bandwidth module 308 similar to the workload module 302 and the bandwidth module 308 discussed above with reference to FIGS. 3A and 3B, respectively. The processor 202C further includes, among other elements, a command module 304C and an I/O module 306C coupled to and/or in communication with one another and with the workload module 302 and the bandwidth module 308.

A command module 304C may include any suitable hardware and/or software that can generate a set of commands on a client device 104. That is, a command module 304C can include, among other components, the hardware and/or software of the command modules 304A and 304B.

In various embodiments, the command module 304C is configured to receive a workload indication from the workload module 302 and/or a bandwidth indication from the bandwidth module 308. Further, the command module 304C is configured to generate the set of commands for the storage system 400 in response to the workload indication indicating that the current workload amount on the client device 104 is greater than or equal to the threshold workload amount and/or the bandwidth indication indicating that the current bandwidth amount between the client device 104 and the storage system 400 is less than or equal to the threshold bandwidth amount. Similar to above, the set of commands includes one or more instructions for the storage system 400 to perform a set of non-storage operations at the storage system 400 for data stored in/on the storage system 400 that is associated with the particular client device 104 and transmit the result(s) of the non-storage operation(s) to the client device 104. Further, a command module 304C is configured to transmit the generated set of commands for the storage system 400 to an I/O module 306C.

An I/O module 306C may include any suitable hardware and/or software that can transmit a set of commands and/or receive a set of results. That is, an I/O module 306C can include, among other components, the hardware and/or software of the I/O modules 306A and 306B.

In various embodiments, an I/O module 306C is configured to transmit a set of commands generated by a command module 304C to a storage system 400 in response to receiving the command(s) from the command module 304C. In additional or alternative embodiments, an I/O module 306C is configured to receive a set of results generated by the storage system 400. In further embodiments, the I/O module 306C is configured to transmit the result(s) received from the storage system 400 to a set of storage devices 204 in the client device 104.

With reference again to FIG. 2, a set of storage devices 204 may include any suitable quantity of storage devices 204 that allow/enable a client device 104 to perform its respective set of operations, set of functions, and/or set of applications. Each storage device 204 in the set of storage devices 204 (also simply referred individually, in various groups, or collectively as storage device(s) 204) may include any suitable type of storage device and/or storage system that is known or developed in the future that can store computer-useable data. In various embodiments, a storage device 204 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

In some embodiments, each storage device 204 and/or the set of storage devices 204 is configured to store and/or stores a set of results received from a storage system 400. That is, the storage device(s) 204 store the result(s) that an I/O module 306A, 306B, or 306C (also simply referred individually, in various groups, or collectively as I/O module(s) 306) received from the storage system 400.

The set of results may include one or more results of a set of non-storage operations performed/executed at the storage system 400 on data stored in the storage system 400, which non-storage operation(s) was/were performed in response to a command generated by a client device 104 that is associated with the data upon which the set of non-storage operations was performed/executed. In various additional or alternative embodiments, the set of results may be stored on one storage device 204 or on multiple storage devices 204 such that a first result of multiple results, a first portion of the first result, and/or a first portion of the multiple results is stored on one storage device 204 and at least a second result of the multiple results, a second portion of the first results, and/or a second portion of the multiple results is stored on one or more different storage devices 204 of the set of storage devices 204.

Figure 4:
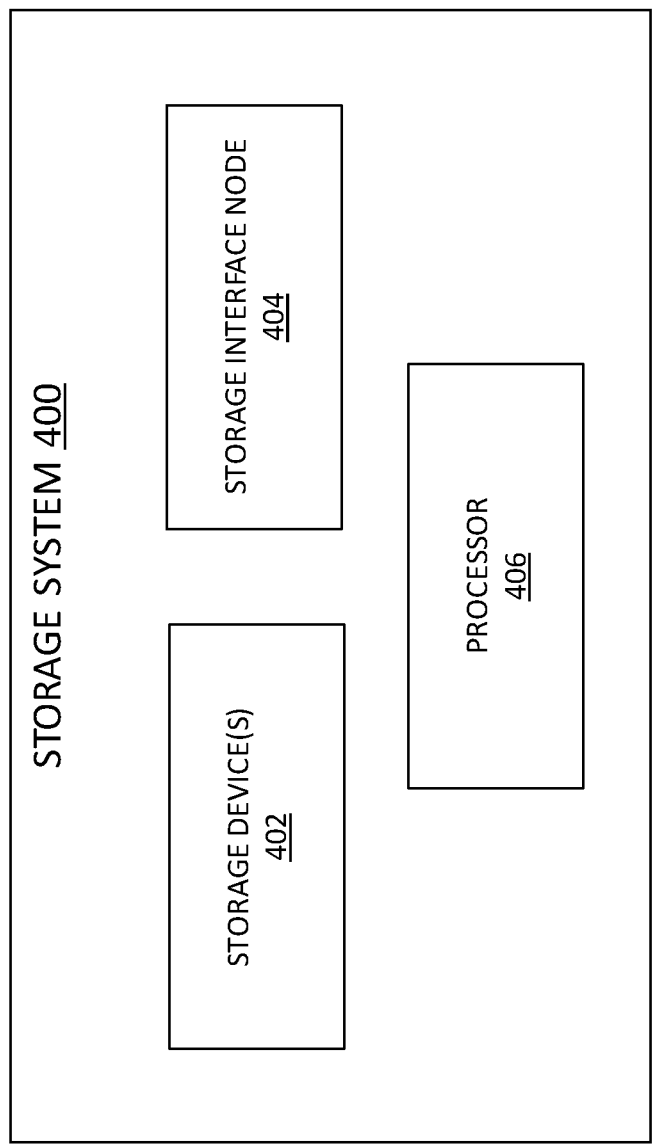
FIG. 4 is a block diagram of one embodiment of a storage system included in the storage network of FIG. 1.

Referring to FIG. 4, FIG. 4 is a block diagram of one embodiment of a storage system 400 included in the example storage network 100 discussed with reference to FIG. 1. At least in the illustrated embodiment, the storage network includes, among other components, a set of storage devices 402, a storage interface node 404, and a processor 406 coupled to and/or in communication with one another.

A set of storage devices 402 (also simply referred to individually, in various groups, or collectively, as storage device(s) 402) may include any type of storage device that is known or developed in the future and is capable of storing data. A set of storage devices 402 may include any suitable quantity of storage devices 402 that allow/enable a storage system 400 to perform its respective set of operations, set of functions, and/or set of applications.

In various embodiments, a set of storage devices 402 can include a storage interface between the set of storage devices 402 and the set of client devices 104. The storage interface may include any suitable type of interface capable of allowing the storage device(s) 402 to communicate with and/or interact with the client device(s) 104. In various embodiments, the storage interface can include a storage file interface, a storage object interface, and/or a storage block interface, among other storage interfaces that are possible and contemplated herein.

A storage device 402, in various embodiments, may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., a processor 406). Further, a storage device 402 may include non-volatile/persistent hardware and/or software configured to perform long-term data storage operations, including, but not limited to, data archiving, data backup, data mirroring, and/or data replicating data, etc., among other long-term data storage operations that are possible and contemplated herein. For instance, a storage device 402 may include non-volatile and/or persistent hardware and/or software configured for performing long-term data storage operations, which may include write operations, read operations, and/or read-write operations, etc., among other storage operations that are possible and contemplated herein.

In various embodiments, the storage device(s) 402 can be implemented as flash memory (e.g., a solid-state devices (SSD) or other non-volatile storage devices that store persistent data). Further, a storage device 402, in some embodiments, may include non-transitory memory such as, for example, a dynamic random access memory (DRAM) device, a static random access memory (SRAM) device, a hard disk drive (HDD), storage tape (e.g., magnetic and/or virtual), and/or other types (e.g., non-volatile and/or persistent) of memory devices, etc., among other types of non-transitory memory that are possible and contemplated herein.

A storage device 402 may include any suitable hardware and/or software that can store data and allow/enable retrieval of the stored data. In some embodiments, the storage device(s) 402 is/are configured to store the data received from and owned by one or more client devices 104 in the storage network 100 (see FIG. 1). In additional or alternative embodiments, the storage device(s) 402 is/are configured to allow/enable the data owned by the client device(s) 104 that is stored in the storage device(s) 404 to be retrieved by a computer processing device (e.g., a processor 406) so that a set of non-storage operations can be performed/executed on the retrieved data, as discussed elsewhere herein.

A storage interface node 404 may include any suitable hardware and/or software that can provide the storage system 400 with the ability to interface with one or more external computing networks, systems, and/or devices. In various embodiments, a storage interface node 404 is configured to enable and/or allow the storage system 400 to communicate with and/or be coupled to the network 102 and/or the client device(s) 104 (see FIG. 1).

The storage interface node 404, in various embodiments, is configured to establish a communication channel between the network 102 and/or the set of client devices 104. In some embodiments, the communication channel established by the storage interface node 402 can allow/enable the storage network 400 to receive data from the set of client devices 104 for storage therein, receive one or more sets of command(s) from one or more client devices 104 for performing/executing a set of non-storage operations at the storage network 400 on data stored on the storage network (e.g., stored in the set of storage devices 402) to generate a set of results, and transmit the result(s) of the non-storage operation(s) to the client device(s) 104, as discussed elsewhere herein.

In some embodiments, the storage interface node 404 is a stand-alone device/system. In additional or alternative embodiments, the storage interface node 404 or at least a portion of the storage interface node 404 is included in or forms at least a portion of a processor 406.

A processor 406 may include any suitable non-volatile/persistent hardware and/or software capable of performing computer processes, functions, and/or algorithms, especially transmitting I/O requests and/or performing I/O operations as discussed elsewhere herein. In various embodiments, the processor 406 includes hardware and/or software configured to execute instructions in one or more modules and/or applications that can receive a set of commands from a client device 104 to perform one or more non-storage operations at the storage system 400 on data stored on the storage system 400 associated with the client device 104 and transmit the result(s) of the non-storage operation(s) to the client device 104.

With reference to FIG. 5A, FIG. 5A is a block diagram of one embodiment of a processor 406A that can be included in and/or as a portion of a storage system 400. At least in the illustrated embodiment, a processor 406A can include, among other components, an operations module 502 and a transmission module 504 coupled to and/or in communication with one another.

An operations module 502 may include any suitable hardware and/or software that can perform a set of operations on data. In some embodiments, an operations module 502 is configured to receive data that is associated with and/or owned by one or more client device(s) 104 stored in one or more storage devices 402 and perform a set of non-storage operations on the data. In various embodiments, the operations module 502 is configured to begin performing the set of non-storage operations in response to receiving the data and/or in response to receiving a notification to begin performance of the non-storage operation(s) (e.g., from a trigger module 512 (see FIG. 5B)).

The set of non-storage operations, in various embodiments, may include one or more operations that can be and/or are typically performed on a conventional host computing device (e.g., a client device 104) and/or is unrelated to the storage operations typically performed by a conventional storage system, which operations are referred to herein as non-storage operations. A set of non-storage operations can include any suitable computer processing algorithm, calculation, and/or sorting operations that are known or developed in the future. In various embodiments, a set of non-storage operations includes one or more non-storage operations performed on large amounts of data. In some embodiments, the set of non-storage operations includes one or more non-storage operations performed on an amount of data that is greater than or equal to a threshold amount of data, which can include any suitable amount of data that would cause a client device 104 and/or storage system 400 to operate more efficiently, would cause less bandwidth to be consumed by the client device(s) 104 and/or storage system 400, and/or would cause an increase in an amount of available bandwidth between the client device(s) 104 and the storage system 400 when/if the non-storage operation(s) are performed at or by the storage system 400 instead of at or by a client device 104. Example non-storage operations can include, but are not limited to, a set of artificial intelligence (AI) operations, a set of deep learning (DL) operations, a set of video processing operations, a set of image processing operations, and/or a set of calculation operations, etc., among other non-storage operations that are possible and contemplated herein and/or that are performed on large amounts of data. One non-limiting example of a non-storage operation can include calculating the mean square error for one gigabyte (1 GB) of data stored on the storage device(s) 402, among other calculations, types of calculations, mathematical operations, and/or amounts of data (data sizes) that are possible and contemplated herein.

In various embodiments, an operations module 502, upon completion of the non-storage operation(s), is configured to generate a set of results based on the non-storage operation(s). The result(s) may include any suitable result and/or type of result that is known or developed in the future that can be useful to a client device 104, is related to the set of operations, the set of functions, and/or set of applications performed by the client device 104, and/or is related to the data owned by the client device 104 upon which the non-storage operation(s) were performed and/or related to other data owned by/associated with the client device 104. The operations module 502 may then transmit the set of results to a transmission module 504.

A transmission module 504 may include any suitable hardware and/or software that can transmit data from the storage system 400 to another computing system or device. In various embodiments, a transmission module 504 is configured to receive a set of results from an operations module 502 and transmit the set of results to a client device 104. The result(s) may be transmitted using any format that is known or developed in the future including, for example, non-compressed, compressed, encrypted, and/or non-encrypted, among other formats that are possible and contemplated herein. In some embodiments, the transmission module 504 is configured to transmit the result(s) to a client device 104 that transmitted a command to the storage system 400 requesting the performance of the non-storage operation(s) and/or to the client device 104 that owns the data upon which the non-storage operation(s) were performed.

Figure 5B:
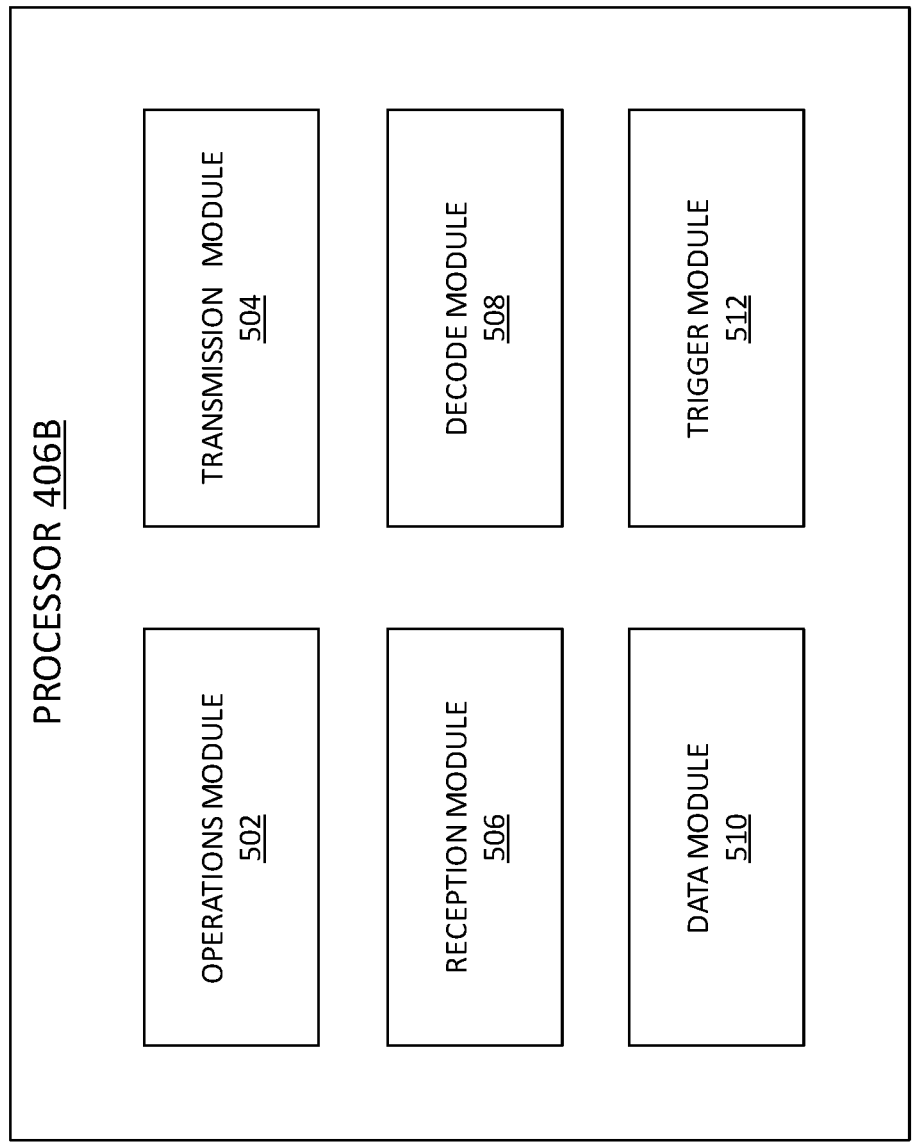

Referring to FIG. 5B, FIG. 5B is a block diagram of another embodiment of a processor 406B that can be included in and/or as a portion of a storage system 400. At least in the illustrated embodiment, a processor 406B includes an operations module 502 and a transmission module 504 coupled to and/or in communication with one another similar to the processor 406A discussed above with reference to FIG. 5A. The processor 406B further includes, among other components, a reception module 506, a decode module 508, a data module 510, and a trigger module 512 coupled to and/or in communication with one another and the operations module 502 and transmission module 504.

A reception module 506 may include any suitable hardware and/or software that can receive data from an external computing network, system, and/or device. In various embodiments, a reception module 506 is configured to receive a set of commands from a set of client devices 104. The command(s) may be received using any suitable format and/or technique that is known or developed in the future that can enable/allow a storage system 400 to receive data. Further, the reception module 506 may be configured to transmit the set of commands to a decode module 508.

A decode module 508 may include any suitable hardware and/or software that can decode a set of commands. In various embodiments, a decode module 508 is configured to receive a set of commands from the reception module 506 and decode the command(s).

A set of commands may include any suitable instruction(s) and/or request(s) that can define and/or target the address of the data stored on the storage system 400 and the performance of a set of non-storage operations on the data. In various embodiments, a command can include and/or identify, among other data/information, a data address and a set of non-storage data operations to be performed on the data residing at the data address. For example, a command for calculating the mean square error of the 1 GB of data stored beginning at an address 0x00000001 may be written as: 'MSE(strat_adddr=0x00000001,length=1 GB)', among other code that is possible and contemplated herein.

In various embodiments, the decode module 508 is configured to decode the command(s) to identify the data address of the data stored on the storage system 400 and the non-storage operation(s) to be performed the identified data. In some embodiments, the decode module 508 is configured to transmit the data address to a data module 510.

A data module 510 may include any suitable hardware and/or software that can identify and retrieve data stored on a storage system 400. In various embodiments, a data module 510 is configured to receive a data address from the decode module 508, identify the data that is the target of the set of non-storage operations based on and/or stored at the data address, retrieves the identified data, and transmits the identified data to the operations module 502. In additional or alternative embodiments, a data module 510 is configured to transmit a notification to a trigger module 512 that the identified data has been retrieved from the data address and/or transmitted to the operations module 502.

A trigger module 512 may include any suitable hardware and/or software that can cause and/or initiate the performance of one or more data processing operations. In various embodiments, a trigger module 512 is configured to receive a notification that identified data has been retrieved from the data address and/or has been transmitted to the operations module 502 from the data module 510. The trigger module 512, in some embodiments, is configured to transmit a notification to the operations module 502 to begin performing the non-storage operations on the identified data in response to receiving the notification from the data module 510.

Figure 6:
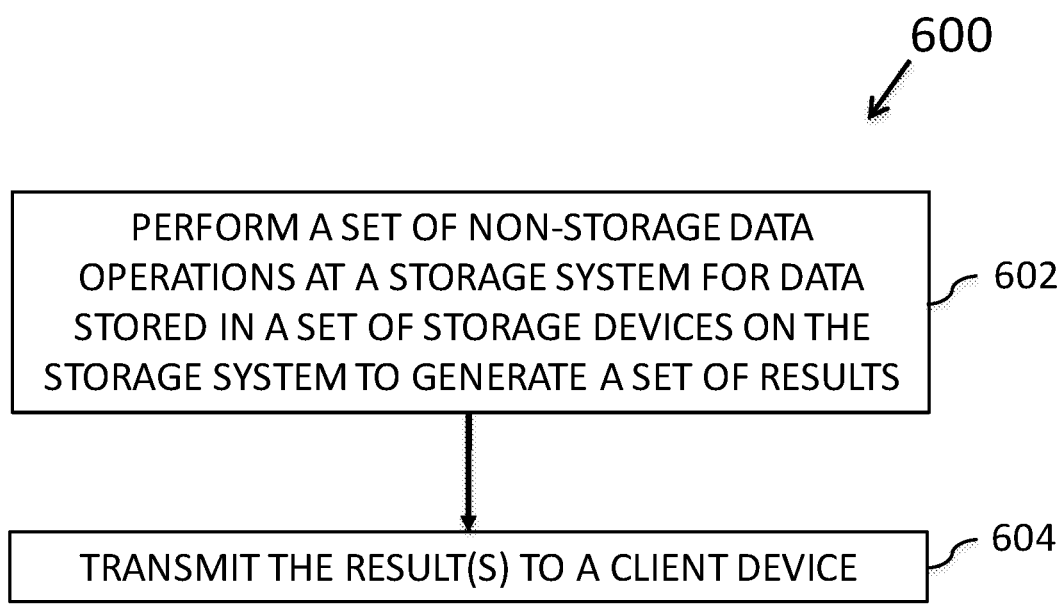
FIG. 6 is a schematic flow chart diagram illustrating one embodiment of a method for offloading data operations to a storage system.

With reference to FIG. 6, FIG. 6 is a schematic flow chart diagram illustrating one embodiment of a method 600 for offloading data operations to a storage system 400. At least in the illustrated embodiment, the method 600 can begin by a processor 406A or 406B (also simply referred to individually, in various groups, or collectively, as processor(s) 406) performing a set of non-storage data operations at a storage system 400 for data stored on the storage system 400 to generate a set of results (block 602). The data stored on the storage system 400 can be owned and/or associated with a client device 104. Further, the set of non-storage data operations may be any of the non-storage data operations discussed elsewhere herein.

The method 600 further includes the processor 406 transmitting the result(s) to a client device 104 (block 604). The client device 104 may be the client device 104 that owns and/or is associated with the data upon which the set of non-storage data operations were performed.

Figure 7:
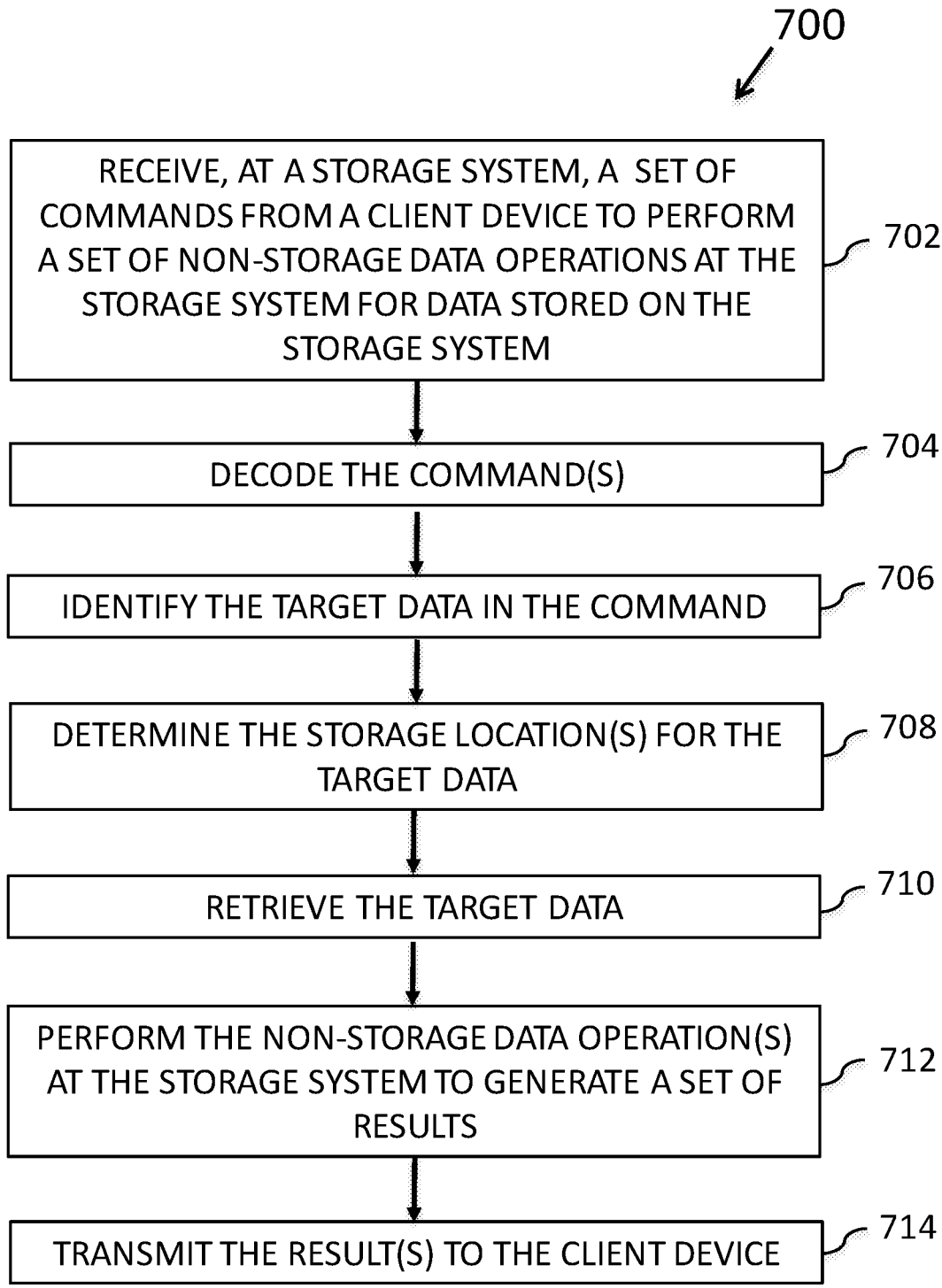
FIG. 7 is a schematic flow chart diagram illustrating another embodiment of a method for offloading data operations to a storage system.

Referring to FIG. 7, FIG. 7 is a schematic flow chart diagram illustrating another embodiment of a method 700 for offloading data operations to a storage system 400. At least in the illustrated embodiment, the method 700 can begin by a processor 406 receiving, at the storage system 400, a set of commands from a client device 104 to perform a set of non-storage data operations at the storage system 400 for data stored on the storage system 400 (block 702). The set commands can include any of the commands discussed elsewhere herein. The data stored on the storage system 400 can be owned and/or associated with a client device 104.

The processor 406 can decode the command(s) received from the client device 104 to identify the non-storage operation(s) to be performed by the storage system 400 (block 704). Further, the processor can identify the target data in the command(s) (block 706) and/or the data address and/or storage location(s) for the target data in the received command(s) (block 708).

The target data can be retrieved by the processor 406 (block 710) and the processor 406 can perform the non-storage data operation(s) on the retrieved data to generate a set of result(s) (block 712). The set of non-storage data operations may be any of the non-storage data operations discussed elsewhere herein.

The processor 406 can then transmit the result(s) to the client device 104 (block 714). The client device 104 may be the client device 104 that owns and/or is associated with the data upon which the set of non-storage data operations were performed.

Figure 8:
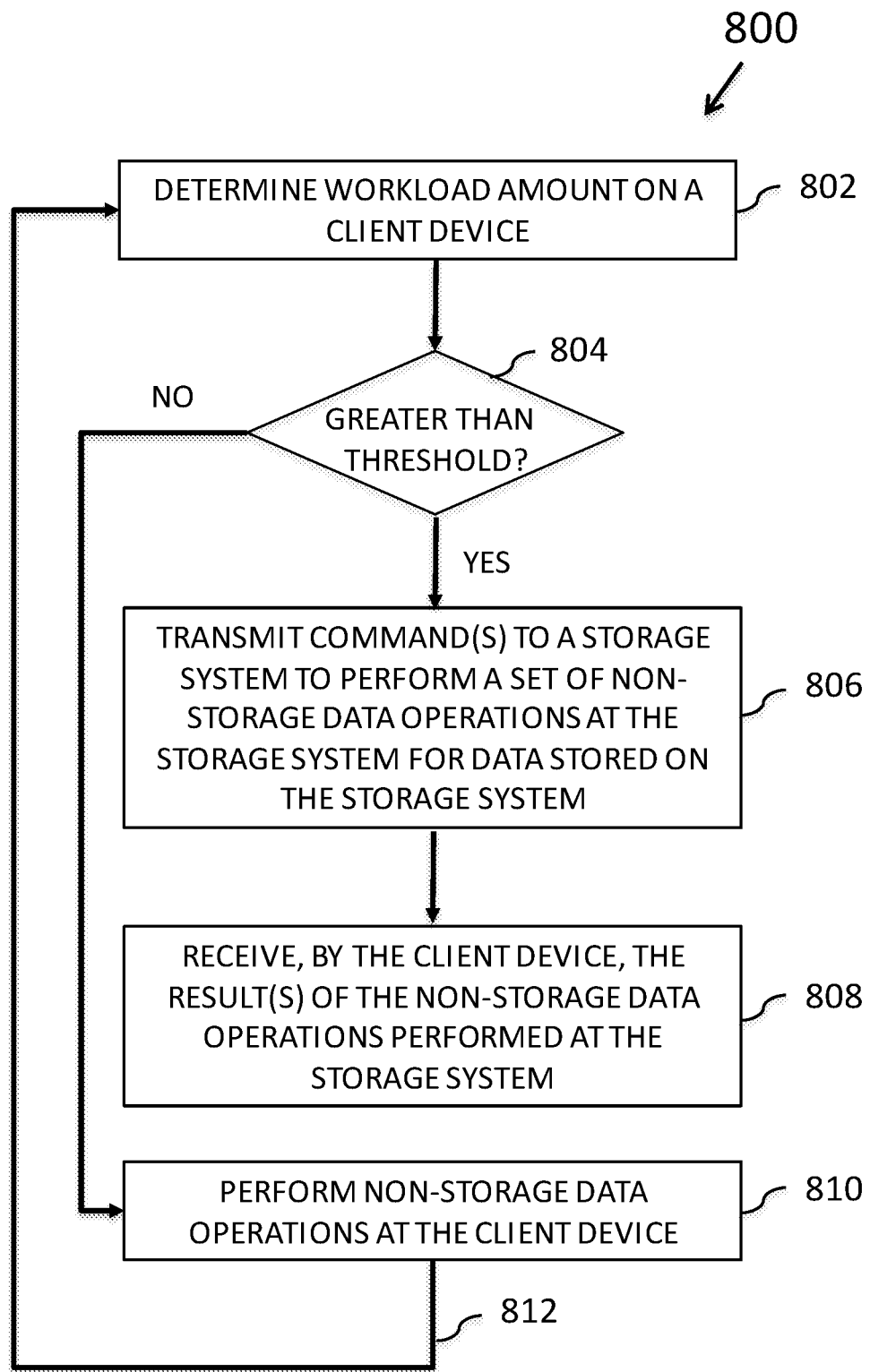
FIG. 8 is a schematic flow chart diagram illustrating yet another embodiment of a method for offloading data operations to a storage system.

With reference to FIG. 8, FIG. 8 is a schematic flow chart diagram illustrating still another embodiment of a method 800 for offloading data operations to a storage system 400. At least in the illustrated embodiment, the method 800 can begin by a processor 202A, 202B, or 202C (also simply referred to individually, in various groups, or collectively, as processor(s) 202) determining a workload amount on a client device 104 (block 802).

The processor 202 can determine whether the workload amount is greater than (or equal to) a threshold workload amount (block 804). In response to the workload amount being greater than (or equal to) the threshold workload amount (e.g., a "YES" in block 804), the processor 202 can transmit a set of commands to a storage system 400 to perform a set of non-storage data operations at the storage system 400 for data stored on the storage system 400 (block 806). The set commands can include any of the commands discussed elsewhere herein. The data stored on the storage system 400 can be owned and/or associated with the client device 104. Further, the processor 202 can receive a set of results of the non-storage data operations from the storage system 400 (block 808), which can be stored in the client device 104.

In response to the workload amount being less than the threshold workload amount (e.g., a "NO" in block 804), the non-storage data operations are performed on the client device (block 810). The processor 202 then continues to determine the workload amount on the client device 104 and the method 800 can be repeated (return 812).

Figure 9:
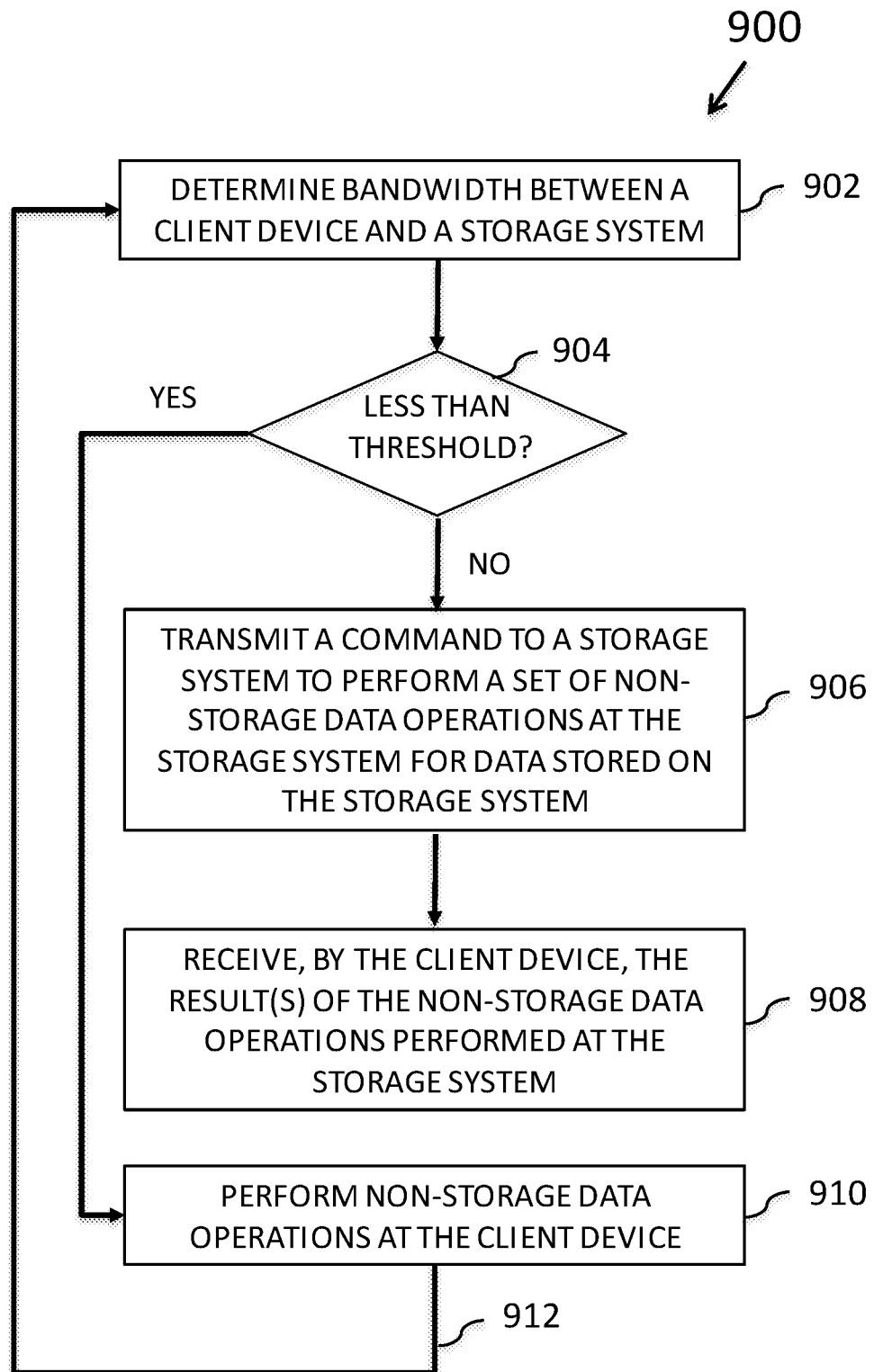
FIG. 9 is a schematic flow chart diagram illustrating still another embodiment of a method for offloading data operations to a storage system.

Referring to FIG. 9, FIG. 9 is a schematic flow chart diagram illustrating yet another embodiment of a method 900 for offloading data operations to a storage system 400. At least in the illustrated embodiment, the method 900 can begin by a processor 202 determining a bandwidth between a client device 104 and the storage system 400 (block 902).

The processor 202 can determine whether the bandwidth is less than (or equal to) a threshold bandwidth amount (block 904). In response to the bandwidth amount being greater than (or equal to) the threshold bandwidth amount (e.g., a "NO" in block 904), the processor 202 can transmit a set of commands to a storage system 400 to perform a set of non-storage data operations at the storage system 400 for data stored on the storage system 400 (block 906). The set commands can include any of the commands discussed elsewhere herein. The data stored on the storage system 400 can be owned and/or associated with the client device 104. Further, the processor 202 can receive a set of results of the non-storage data operations from the storage system 400 (block 908), which can be stored in the client device 104.

In response to the bandwidth amount being less than the threshold bandwidth amount (e.g., a "YES" in block 904), the non-storage data operations are performed on the client device (block 910). The processor 202 then continues to determine the bandwidth between the client device 104 and the storage system 400 and the method 900 can be repeated (return 912).

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising:
an operations module that, in response to receiving a command from a client device that offloads a set operations that form a portion of a workload scheduled for performance on the client device, performs a set of non-storage operations corresponding to the set of operations that form the portion of the workload on a storage system for data stored in a set of storage devices on the storage system to generate a set of results, the command transmitted by the client device in response to a determination that a bandwidth between the storage system and the client device that owns the data is greater than or equal to a threshold bandwidth amount; and
a transmission module that transmits the set of results to the client device,
wherein:
the storage system is separate from the client device that owns the data, and
at least a portion of said modules comprises one or more of a set of hardware circuits, a set of programmable hardware devices, and executable code stored on a set of non-transitory computer-readable storage media.

2. The apparatus of claim 1, further comprising:
a reception module that receives, at the storage system, the command from the client device to perform the non-storage operations on the data corresponding to the set of operations that form the portion of the workload.

3. The apparatus of claim 2, wherein:
the operations module performs the set of non-storage operations on the data corresponding to the set of operations that form the portion of the workload in response to receiving the command from the client device.

4. The apparatus of claim 2, further comprising:
a decode module that decodes the command to determine the set of non-storage operations corresponding to the set of operations that form the portion of the workload from a plurality of non-storage operations for performance on the data.

5. The apparatus of claim 4, further comprising:
a data module that:
identifies the data within the command,
determines one or more storage locations in the set of storage devices storing the data, and
retrieves the data from the one or more storage locations in the set of storage devices.

6. The apparatus of claim 5, further comprising:
a trigger module that triggers the operations module to begin performing the set of non-storage operations on the data corresponding to the set of operations that form the portion of the workload in response to the retrieval of the data from the one or more storage locations in the set of storage devices.

7. The apparatus of claim 1, wherein the set of non-storage operations corresponding to the set of operations that form the portion of the workload comprises at least one of:
a set of artificial intelligence (AI) operations;
a set of deep learning (DL) operations;
a set of video processing operations;
a set of image processing operations; and
a set of calculation operations.

8. A method, comprising:
performing, by a processor in response to receiving a command from a client device that offloads a set operations that form a portion of a workload scheduled for performance on the client device, a set of non-storage operations corresponding to the set of operations that form the portion of the workload on a storage system for data stored in a set of storage devices on the storage system to generate a set of results, the command transmitted by the client device in response to a determination that a bandwidth between the storage system and the client device that owns the data is greater than or equal to a threshold bandwidth amount, wherein the storage system is separate from the client device that owns the data; and
transmitting the set of results to the client device.

9. The method of claim 8, further comprising:
receiving, at the storage system, a command from the client device to perform the non-storage operations on the data corresponding to the set of operations that form the portion of the workload.

10. The method of claim 9, wherein:
the set of non-storage operations corresponding to the set of operations that form the portion of the workload are performed on the data in response to receiving the command from the client device.

11. The method of claim 9, further comprising:
decoding the command to determine the set of non-storage operations corresponding to the set of operations that form the portion of the workload from a plurality of non-storage operations for performance on the data.

12. The method of claim 11, further comprising:
identifying the data within the command;
determining one or more storage locations in the set of storage devices storing the data; and
retrieving the data from the one or more storage locations in the set of storage devices.

13. The method of claim 12, further comprising:
triggering a beginning of the performance of the set of non-storage operations on the data corresponding to the set of operations that form the portion of the workload in response to retrieving the data from the one or more storage locations in the set of storage devices.

14. The method of claim 8, wherein performing the set of non-storage operations corresponding to the set of operations that form the portion of the workload comprises at least one of:
performing a set of artificial intelligence (AI) operations;
performing a set of deep learning (DL) operations;
performing a set of video processing operations;
performing a set of image processing operations; and
performing a set of calculation operations.

15. A computer program product comprising a computer-readable storage medium including program instructions embodied therewith, the program instructions executable by a processor to cause the processor to:
perform, in response to receiving a command from a client device that offloads a set operations that form a portion of a workload scheduled for performance on the client device, a set of non-storage operations corresponding to the set of operations that form the portion of the workload on a storage system for data stored in a set of storage devices on the storage system to generate a set of results, the command transmitted by the client device in response to a determination that a bandwidth between the storage system and the client device that owns the data is greater than or equal to a threshold bandwidth amount, wherein the storage system is separate from the client device that owns the data; and
transmit the set of results to the client device.

16. The computer program product of claim 15, wherein the program instructions further cause the processor to:
receive, at the storage system, a command from the client device to perform the non-storage operations on the data corresponding to the set of operations that form the portion of the workload.

17. The computer program product of claim 16, wherein the program instructions further cause the processor to:
decode the command to determine the set of non-storage operations corresponding to the set of operations that form the portion of the workload from a plurality of non-storage operations for performance on the data.

18. The computer program product of claim 17, wherein the program instructions further cause the processor to:
identify the data within the command;
determine one or more storage locations in the set of storage devices storing the data; and
retrieve the data from the one or more storage locations in the set of storage devices.

19. The computer program product of claim 18, wherein the program instructions further cause the processor to:
trigger a beginning of the performance of the set of non-storage operations on the data corresponding to the set of operations that form the portion of the workload in response to the retrieval of the data from the one or more storage locations in the set of storage devices.

20. The computer program product of claim 15, wherein:
the program instructions further cause the processor to perform the set of non-storage operations on the data corresponding to the set of operations that form the portion of the workload in response to receiving the command from the client device; and
the program instructions, in the performance of the set of non-storage operations corresponding to the set of operations that form the portion of the workload, further cause the processor to perform at least one of:
a set of artificial intelligence (AI) operations,
a set of deep learning (DL) operations,
a set of video processing operations,
a set of image processing operations, and
a set of calculation operations.

* * * * *